United States Patent
Sander et al.

(10) Patent No.: US 8,977,237 B1
(45) Date of Patent: Mar. 10, 2015

(54) SAFETY NOTIFICATION SERVICE

(71) Applicant: Allstate Insurance Company, Northbrook, IL (US)

(72) Inventors: David R. Sander, Palatine, IL (US); Philip Peter Ramirez, Arlington Heights, IL (US); William Loo, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 114 days.

(21) Appl. No.: 13/803,575

(22) Filed: Mar. 14, 2013

(51) Int. Cl.
*H04M 1/66* (2006.01)
*H04M 11/04* (2006.01)
*H04W 4/02* (2009.01)

(52) U.S. Cl.
CPC ........................................ *H04W 4/02* (2013.01)
USPC ...................... 455/411; 455/404.1; 455/404.2; 455/414.1; 455/456.1

(58) Field of Classification Search
None
See application file for complete search history.

(56) References Cited

U.S. PATENT DOCUMENTS

| | | | |
|---|---|---|---|
| 6,914,525 B2 | 7/2005 | Rao et al. | |
| 7,174,150 B2 | 2/2007 | Shida | |
| 7,974,645 B2 | 7/2011 | Choi-Grogan | |
| 7,987,277 B2 | 7/2011 | Endo et al. | |
| 8,023,621 B2 | 9/2011 | Hulls | |
| 8,279,786 B1 | 10/2012 | Smith et al. | |
| 8,624,727 B2 * | 1/2014 | Saigh et al. | 340/539.13 |
| 2005/0027571 A1 | 2/2005 | Gamarnik et al. | |
| 2009/0018875 A1 | 1/2009 | Monatesti et al. | |
| 2009/0037547 A1 * | 2/2009 | Endo et al. | 709/206 |
| 2009/0309742 A1 * | 12/2009 | Alexander et al. | 340/601 |
| 2010/0315230 A1 | 12/2010 | Kwon et al. | |
| 2012/0028600 A1 * | 2/2012 | Vallaire | 455/404.2 |
| 2012/0123806 A1 | 5/2012 | Schumann, Jr. et al. | |
| 2012/0179421 A1 | 7/2012 | Dasgupta | |

FOREIGN PATENT DOCUMENTS

| | | |
|---|---|---|
| EP | 1076313 | 2/2001 |
| EP | 1563470 | 8/2005 |
| EP | 1682976 | 7/2006 |
| EP | 1817708 | 8/2007 |
| EP | 1717554 | 2/2011 |
| EP | 2437515 | 4/2012 |
| EP | 1874077 | 9/2012 |
| EP | 2530614 | 12/2012 |

(Continued)

OTHER PUBLICATIONS

Disaster Victim Identification Guide: INTERPOL 2009, 55 pages.

(Continued)

*Primary Examiner* — Erika A Washington
(74) *Attorney, Agent, or Firm* — Banner & Witcoff, Ltd.

(57) ABSTRACT

An automated safety notification system is proposed herein in which one or more safe zone access points may be physically deployed to one or more safe zones associated with a disaster area. If a person with a mobile phone or other mobile device enters the safe zone, the safe zone access point may detect the presence of the mobile device and perform certain functions in response to the detection. For example, the safe zone access point may initiate contact of a predetermined plurality of contacts that the person may have already designated before the disaster. The safe zone access point may also be used to initiate an insurance claim.

20 Claims, 9 Drawing Sheets

(56) References Cited

FOREIGN PATENT DOCUMENTS

JP          2011091720 A  *  5/2011
WO          2012139213        10/2012

OTHER PUBLICATIONS

Disaster Victim Identification, <www.anzpaa.org.au/resources-and-links/disaster-victim-identification>, obtained from Internet Jan. 28, 2013, 1 page.

First Responder Interoperable Communications, Emergency Notification Systems and Interoperable Communication Systems for Emergency Management, First Responders, and Public Safety, >www.cooperindustries.com/content/public/en/safety/notification/products/mass_notificationsystems/distributed_recipientpersonalalerting/rsan_emergency_manag . . . >, obtained from Internet Jan. 28, 2013, 3 pages.

Liu, et al., "An Efficient Data Evacuation Strategy for Sensor Networks in Postdisaster Applications", Hindawi Publishing Corporation, <http://www.hindawi.com/journals/ijdsn/2013/718297/>, International Journal of Distributed Sensor Networks, vol. 2013 (2013), Article ID 718297, 12 pages, received Oct. 10, 2012, Accepted Nov. 26, 2012, 9 pages.

Sheri, et al., "Implementation of AODV Protocol for Effective Disaster Management System", International Journal of Advanced Technology & Engineering Research (IJATER), National Conference on Emerging Trends in Technology (NCET-Tech), vol. 2, Issue 4, Jul. 2012, pp. 50-58.

Moscaritolo, "Stay Connected After Disasters with Microsoft's HelpBridge App", <www.pcmag.com/article2/0,2817,2414377,00.asp>, Jan. 16, 2013, 5 pages.

Emergency Contact/Safety Notification System, "Emergency Call/Business Port", Infocom Corporation, <www.kddi.com/english/business/saas_sol/emc/index.html>, obtained from Internet Jan. 28, 2013, 3 pages.

Waseda University Earthquake Response Manual (English Edition), Mar. 1, 2009, 2 pages.

FAQ, American Red Cross, <http://www.redcross.org/help-faq>, obtained from Internet Jan. 28, 2013, 9 pages.

DSHR Individual Client Services (CLS), <https://redcrosscrc.org/disaster-services-human-resources-dshr/dshr-ind . . . >, obtained from Internet Jan. 28, 2013, 2 pages.

American Red Cross, Safe and Well, <https://safeandwell.communityos.org/cms//>, obtained from Internet Jan. 29, 2013, 12 pages.

* cited by examiner

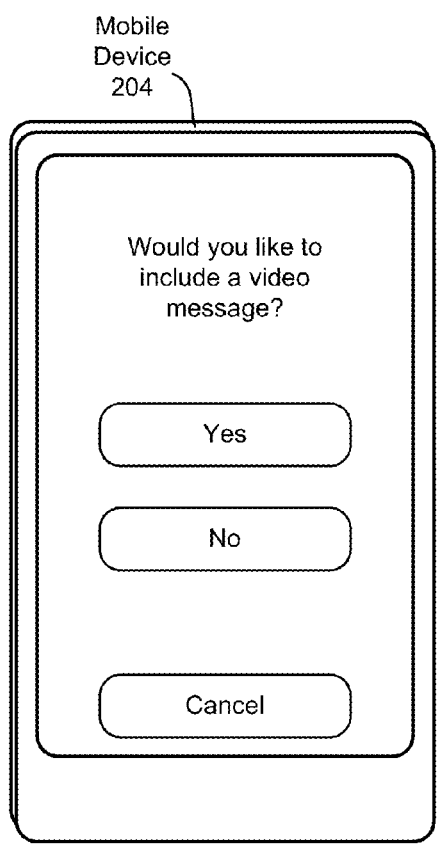 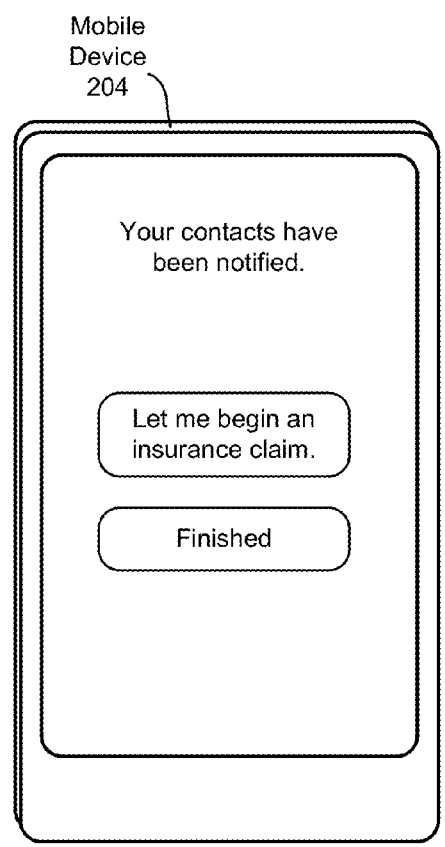
FIG. 9     FIG. 10

SAFETY NOTIFICATION SERVICE

BACKGROUND

When a natural or manmade disaster occurs, many people often find themselves without resources, without adequate transportation and infrastructure, and/or even without homes. Emergency responders and insurance companies try to help victims as best they can. However, victims of natural disasters could always use more assistance. For example, a person who is a victim of a natural disaster may want to contact loved ones, friends, and colleagues to let them know that the person has survived. When communication and transportation infrastructure is compromised in a disaster area, though, this is not always possible.

SUMMARY

An automated safety notification system is proposed herein in which one or more safe zone access points may be physically deployed to one or more safe zones associated with a disaster area. If a person with a mobile phone or other mobile device enters the safe zone, the safe zone access point may detect the presence of the mobile device and perform certain functions in response to the detection. For example, the safe zone access point may initiate contact of a predetermined plurality of contacts that the person may have already designated before the disaster. The safe zone access point may also be used to initiate an insurance claim. These and other features may be helpful to the victim of the disaster and to the victim's contacts, who may not otherwise be able to receive any status information about the victim.

According to some aspects as described herein, methods, apparatuses, and software may perform, for example, at least the following process. The presence of a mobile device in a safe zone may be wirelessly detected. It may be determined whether the mobile device is associated with a person who resides in a disaster area or who has property in the disaster area. Responsive to determining that the mobile is associated with a person who resides in a disaster area or who has property in the disaster area, a message may be sent to a plurality of contacts.

According to further aspects as described herein, an access point comprising at least one computing device and at least one wireless sensor may be deployed, such as in a safe zone. The access point may be configured to wirelessly detect the presence of a mobile device, and to send a message over a network indicating the detected presence. A notification manager may be communicatively coupled to the access point via the network and may comprise at least one computing device. The notification manager may be configured to receive the message, determine whether the mobile device is associated with a person who resides in a disaster area or who has property in the disaster area, and, if so, send a message to a plurality of contacts.

According to still further aspects as described herein, the presence of a mobile device in a safe zone may be wirelessly detected. It may be determined whether the mobile device is associated with a person who is not an emergency responder, who does not reside in a disaster area, and who does not have property in the disaster area. Responsive to determining that the person is not an emergency responder, does not reside in a disaster area, and does not have property in the disaster area, a message may be sent to a plurality of contacts.

These features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

FIGS. 7-12 show example user interface screens that may be presented by a mobile device, in accordance with one or more aspects as described herein.

DETAILED DESCRIPTION

Figure 1:
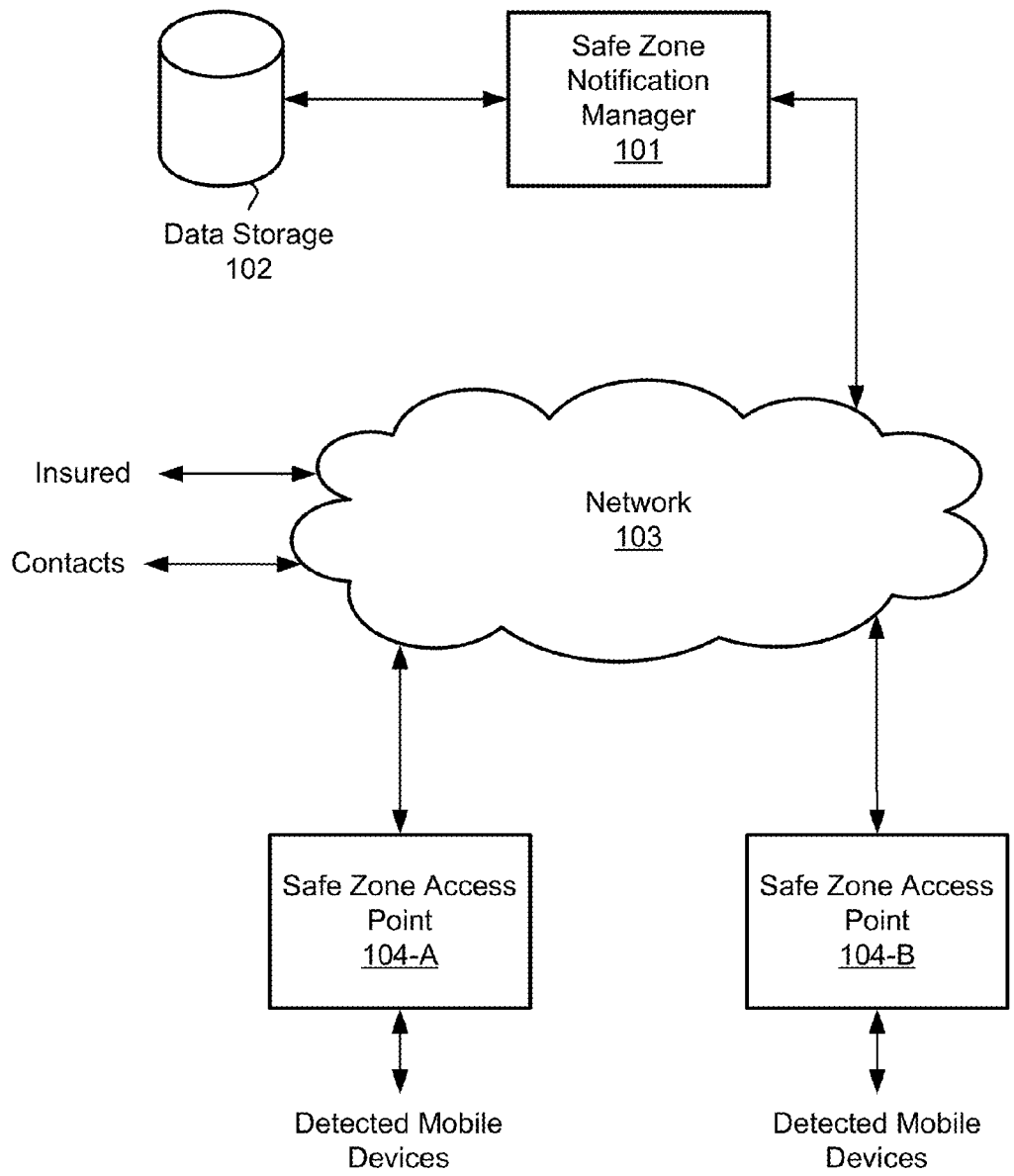
FIG. 1 illustrates an example infrastructure in which one or more aspects as described herein may be practiced.

FIG. 1 is a block diagram of an example infrastructure that may be used in accordance with aspects as described herein. The infrastructure in this example includes an insurance company having or otherwise having access to a safe zone notification manager 101 and data storage 102. The infrastructure in this example may further include a network 103 and one or more safe zone access points 105 (e.g., 104-A and 104-B).

The insurance company may have or otherwise control one or more computing and/or data storage resources for performing various functions related to insurance claims processing. The various blocks 101-104 of FIG. 1 may each include or otherwise be embodied as one or more computing devices, such as one or more servers, personal computers, tablet computer, and the like, and/or one or more humans performing various tasks. Moreover, while each of the elements 101-104 are shown in FIG. 1 as separate elements, these elements may be physically and/or logically combined in any combination or subcombination, and/or further physically and/or logically sub-divided. The term "computing device" is broadly used herein to include both a single device (e.g., a single server) as well as multiple devices that work together (e.g., a plurality of servers and/or personal computers).

The insurance company may be responsible for processing incoming claims (e.g., in the form of data), and for making a determination as to how to process those claims. In addition, as will be described in greater detail below, the insurance company may provide other services such as assisting insured customers with notifying contacts of their safety status in connection with a disaster. A disaster, as referred to herein, may include any type of disaster, such as a natural disaster (e.g., hurricane, tornado, storm, earthquake, tsunami, drought, flood, etc.), and a manmade disaster (e.g., terrorism, riot, war, etc.). While this service is described as being provided by an insurance company, such a safety notification service may be provided by any service entity to any types of customers or other users.

Where the user are customers of the insurance company, the customers and/or their property may be covered by one or more insurance policies, such as but not limited to a life insurance policy, a disability policy, a homeowner's insurance policy, a renter's insurance policy, an automobile insurance policy, a watercraft insurance policy, an aircraft insurance policy, a motorcycle insurance policy, a specialized equipment coverage policy, an umbrella insurance policy, a re-insurance policy, and the like. The insurance company may operate exclusively as an insurance company or it may provide additional services as well such that insurance is but one of multiple services that may be provided by the insurance company.

Figure 2:
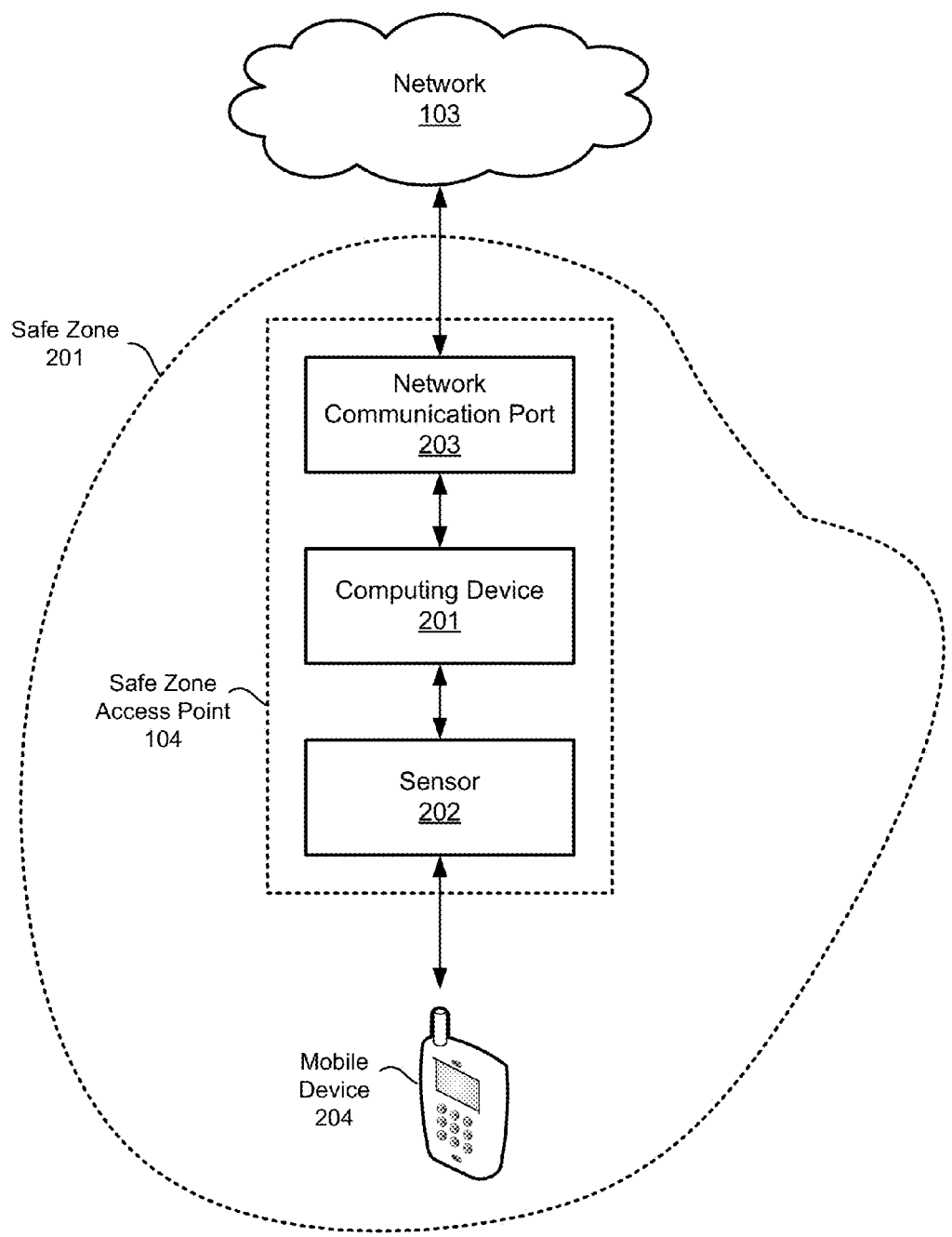
FIG. 2 is a block diagram of an example safe zone access point, in accordance with one or more aspects as described herein.

The safe zone access points 104 may each be responsible for detecting entry of a mobile device into a safe zone, reporting such detected entry to the safe zone manager, and/or providing certain services to a user of the detected mobile device. Each safe zone access point 104 may include one or more computing devices, one or more entry detection sensors, and/or one or more network communication ports. For example, referring to FIG. 2, each safe zone access point 104 may include a computing device 201, a sensor 202, and/or a network communication port 203 (and/or multiple quantities of any of these elements). Computing device 201 may perform any logic and/or processing for implementing and/or controlling the functionality of the safe zone access point 104. Sensor 202 may interact, wirelessly and/or via contact such as via wired content, with one or more mobile devices 204 that may be within sensing range of the sensor 202. Examples of mobile devices 204 may include, but are not limited to, cellular phones, mobile computers, watches, pagers, RFID tags, GPS devices, and/or any other devices that are capable of communicating (wirelessly and/or via wire) with another device in a unidirectional or bidirectional manner. The sensor 202 may be any type of sensor suitable for detecting and/or interacting with the mobile device 204, such as but not limited to a radio frequency transceiver/antenna, an RFID reader, a near-field communication (NFC) circuit, a port for an electronic connector such as a USB port, an optical communication circuit, and the like. Likewise, the mobile devices 204 may also have circuitry for communicating with and/or identifying themselves to the sensor 202. The network communication port 203 may provide for communications between the safe zone access point 104 and the safe zone notification manager 101 via the network 104.

Figure 3:
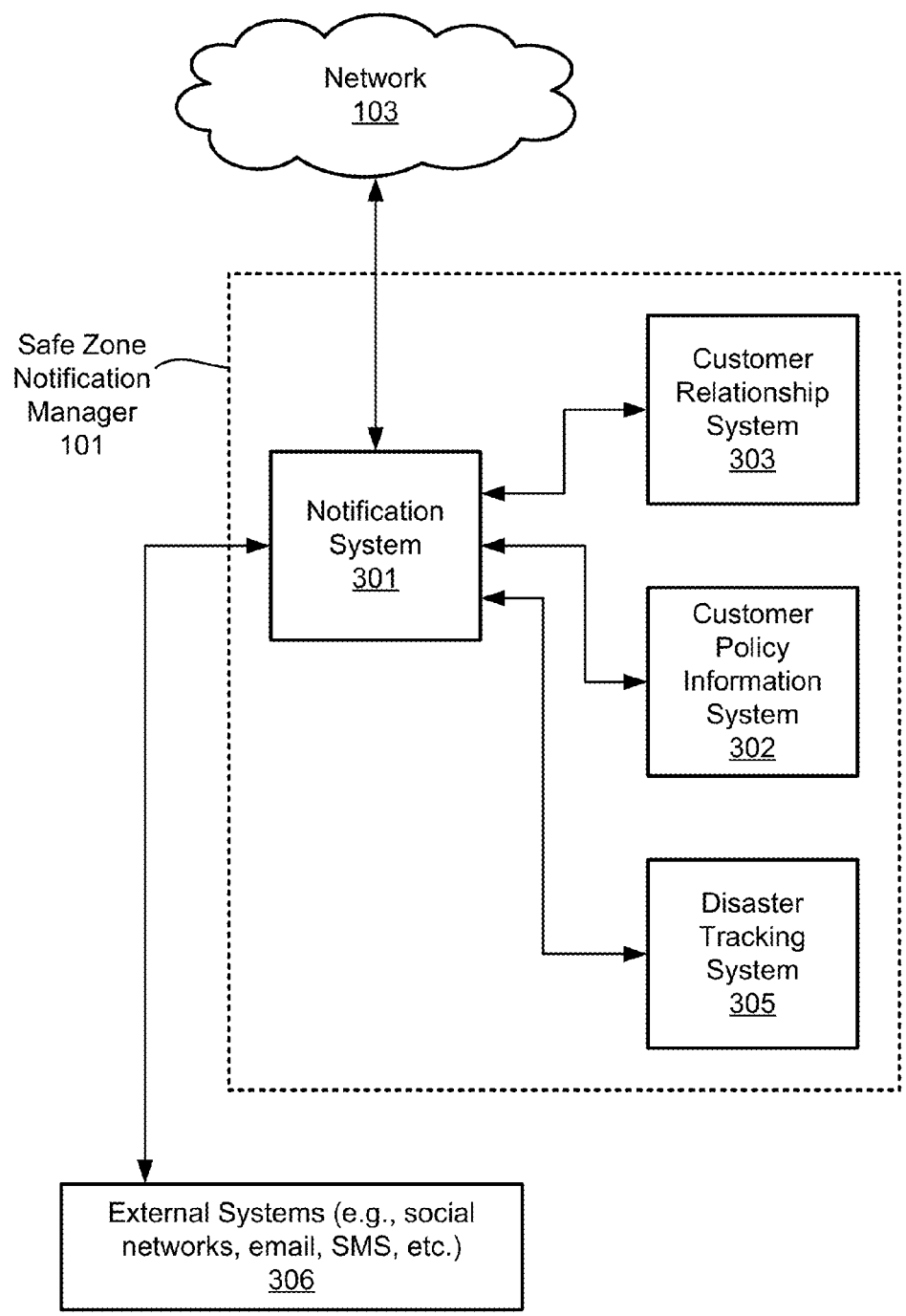
FIG. 3 is a block diagram of an example safe zone notification manager, in accordance with one or more aspects as described herein.

The safe zone notification manager 101 may be responsible for controlling the notification process, implementing various logic and decisions during the process, and obtaining and maintaining the data used to implement the notification process. The safe zone notification manager 101 may include one or more sub-systems and/or devices. For example, referring to the block diagram of FIG. 3, the safe zone notification manager 101 may include a notification system 301, a customer policy information system 302, a customer relationship system 303, a safety location system 304, and/or a disaster tracking system 305. While these elements 301-305 are shown in FIG. 3 as separate blocks, any or all of these elements may be physically and/or logically combined together and/or further physically and/or logically subdivided as desired.

The notification system 301 may be responsible for communicating with external systems such as with the one or more safe zone access points 104 and/or with other services 306 such as social networks (e.g., Facebook, Google Plus), email services, messaging (e.g., SMS text messaging and/or other instant messaging), and the like. Any of the communications between the notification system 301 and the other external system may be made using, for instance, the network 103. The notification system 301 may also be responsible for identifying a person who has been detected to enter a safe zone, determining whether to notify others of the safety status of that person, which contacts to notify, and/or other decisions related to the notification process. The notification system 301 may also be responsible for interfacing with customers to allow them to enter predefined sets of contacts to be used for notification services, interfacing with the other sub-systems 302-305 such as for updating, maintaining, and/or obtaining information needed for notification, and/or sending notifications to designated contacts such as through the other services 306.

The customer policy information system 302 may be responsible for maintaining and/or updating information about each customer's insurance policies. Such insurance policy information may include, for example, information as to which policies exist, what property is covered by each policy, the location of the property, and/or information about the customer such as the customer's residence(s), age, gender, and/or other information. As will be described further below, the property information and/or the customer information may be a factor in making notification decisions.

The customer relationship system 303 may be responsible for maintaining and/or updating information about relationships between each customer and other persons. For example, for each customer that desires to use the notification system, that customer may have a predetermined notification profile indicating one or more contacts for that customer. Notifications of the safety status of a customer may be sent to some or all of the predetermined contacts associated with that customer. The set of contacts may be automatically defined such as based on information that the insurance company has about the customer (e.g., the customer's family members), and/or manually defined by the customer and/or by employees and/or other agents of the insurance company. The information may include, for each of the contacts, information about how to reach the contact, such as the contact's telephone number, email address, mailing address, fax number, instant message ID, and the like.

The disaster tracking system 305 may be responsible for determining and maintaining information about each disaster area that may exist. The information may include, for example, the geographical area covered by the disaster area, the type of disaster, the timeframe of the disaster and/or that the disaster area is in effect, and/or other information about each disaster and/or each disaster area. Disaster areas may be designated in any of a number of ways. For example, disaster areas may be defined by external sources (e.g., a government agency), and information about such disaster areas may be provided to the disaster tracking system 305 via, e.g., the network 103, and/or via manual entry by a human user. Additionally or alternatively, disaster areas may be defined based on the geographical and/or time distribution of insurance claims that have been made. For instance, if a sudden large spike in flood claims is being received in a certain geographical region, then the disaster tracking system 305 may, based on this information, determine that a disaster area is in effect for the geographical region. The boundaries of the disaster area may depend upon the locations of the properties for which such flood (or other types of) claims are made. The disaster tracking system 305 may use, for example, statistical algorithms for determining where, when, and/or whether disaster areas should be defined.

Returning to FIG. 1, data storage 102 represents one or more computer-readable storage media (e.g., non-transitory media) that may store any of the information (such as in the form of data) referred to herein. Thus, data storage 102 may store the customer information, insurance policy information, property information, disaster area information, safe zone information, and/or customer relationship information discussed herein. Data storage 102 may be physically separate from the subsystems 301-305 of the safe zone notification manager 101. For instance, data storage 102 may be embodied as racks of tape storage drives and/or hard drives. Alternatively, data storage 102 may be partially or fully integrated with computing assets of those subsystems 301-305. For instance, data storage 102 may be embodied as one or more hard drives, memory, and/or other computer-readable storage media that are at least partially part of one or more of the computing devices of one or more of the subsystems 301-305. Moreover, data storage 102 may include one or more computer-readable data storage devices, which may in turn include one or more computer-readable storage media. In addition, data storage 102 may include or be interfaced by a database system that can be queried to update and/or retrieve data to/from data storage 102.

Any or all of various blocks 101, 102, and 104 may be communicatively connected to one another via one or more networks such as network 103. Non-limiting examples of the network 103 include the Internet, an intranet, a local area network, a wide-area network, a wired network (e.g., a landline telephone network, and Ethernet network, etc.), a wireless network (e.g., an IEEE 802.11 compliant network, a BLUETOOTH network, a cellular telephone and/or data network, etc.), and/or an optical network.

Figure 4:
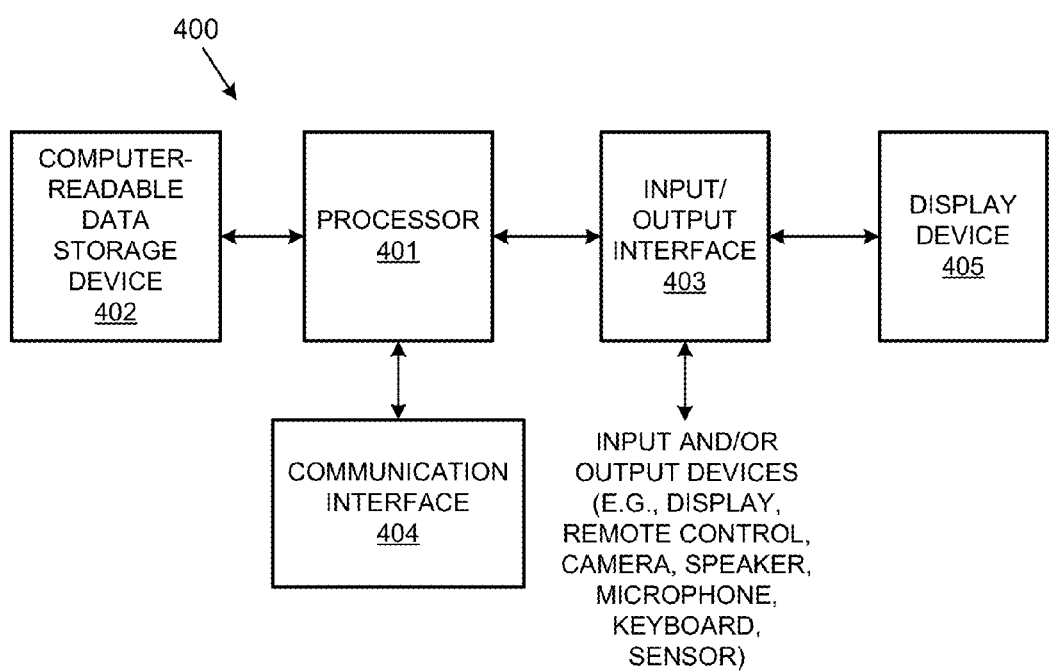
FIG. 4 is a block diagram of an example computing device that may be used to embody or otherwise implement any of the elements and functions discussed herein.

FIG. 4 illustrates an example of general hardware and/or software elements that can be used to partially or fully embody any of the various devices and functions discussed herein, such as any of the elements 101-104, 201-204, and 301-306 discussed herein with regard to FIG. 1. A computing device 400 (also often referred to as a computer) may include one or more processors 401, which may execute instructions of a computer program to perform any of the features described herein. The instructions may be stored in any type of tangible and/or non-transitory computer-readable data storage device 402 (which may include one or more computer-readable storage media, such as a memory or hard drive) to configure the operation of the processor 401. For example, instructions may be stored in a read-only memory (ROM), a random access memory (RAM), a removable media such as a Universal Serial Bus (USB) drive, compact disk (CD) or digital versatile disk (DVD), a floppy disk drive, an attached (or internal) hard drive, and/or any other desired data storage medium. The computing device 400 may include or be coupled to one or more output devices, such as a display device 405 (e.g., an external television, or a computer monitor), and may include one or more output device controllers, such as a video processor. The display device 405 may be physically separate from the computing device 400, or it may be integrated with the remainder of the computing device 400. There may also be one or more user input devices, such as a remote control, camera, keyboard, mouse, touch screen, microphone, etc. The computing device 400 may also include a communication interface 404, which may include one or more input and/or output circuits (e.g., in the form of a network card) to communicate with an external device or network (e.g., the above-discussed one or more networks). The communication interface 404 may include one or more wired interfaces, wireless interfaces, or a combination of the two.

Figure 5:
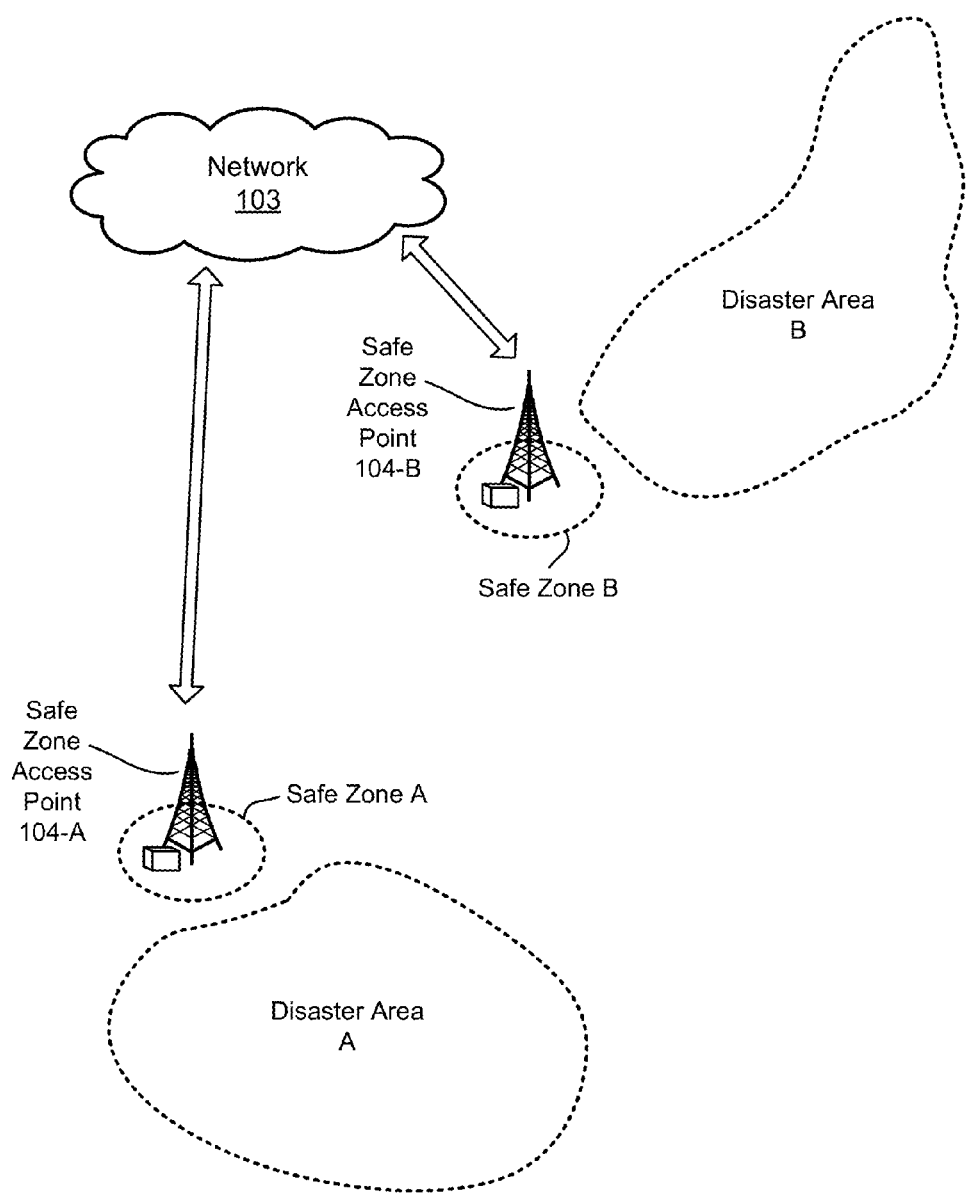
FIG. 5 shows an example of disaster areas and safety zones with associated safety zone access points, in accordance with one or more aspects as described herein.

FIG. 5 graphically shows an example of two disaster areas (disaster area A and disaster area B) and their respective safe zones (safe zone A and safe zone B). Also, each of the safe zones includes one or more safe zone access points 104 (in this example, safe zone access points 104-A and 104-B). While the safe zones and the disaster areas are shown to have particular shapes, these shapes are merely examples. The safe zones and the disaster areas may be of any shape.

The shape of the disaster areas may depend upon the nature of the disaster and the geographic extent of the disaster. For example, if the disaster is a wildfire, it is likely that the area affected by the wildfire may not be perfectly circular, but instead may follow topological features and/or other features of the environment. On the other hand, the shape of the safety zones may depend largely upon the sensing range of the one or more safe zone access points 104 installed in the safety zones. For example, if a safe zone access point 104 detects the presence of a mobile device 204 (such as via wireless radio frequency communication with the mobile device), then that mobile device 204 may be considered within the safe zone services by the safe zone access point 104. Thus, the safe zone may have boundaries that also depend upon the sensitivity and/or signal strength of the mobile devices 204. In other words, the precise shape and/or size of a safe zone may be different for different mobile devices 204. Moreover, a safe zone access point 104 may utilize different types of sensing technology (e.g., RFID and BLUETOOTH) to accommodate multiple types and varieties of mobile devices 204, and so the boundaries of the safe zone for a given mobile device 204 may further depend on the technology used to sense the presence of the mobile device 204.

In addition to sensing the presence of a mobile device 204, the safe zone access point 104 may also be able to uniquely identify the mobile device 204. For example, each mobile device 204 may be configured to transmit or otherwise transfer information (e.g., data) to the safe zone access point 104 sufficient to uniquely identify the mobile device 204. Examples of such information include, but are not limited to, a telephone number, network address, serial number, and/or other identifier of the mobile device 204, and/or an identifier of a user of the mobile device 204 (e.g., by name or insurance customer ID). The safe zone access point 104 may transfer the received information using the network communication port 203, via the network 103, to the notification system 301. The notification system 301, in turn, may use the received information to determine whether to make notifications and to whom the notifications should be made.

Figure 6:
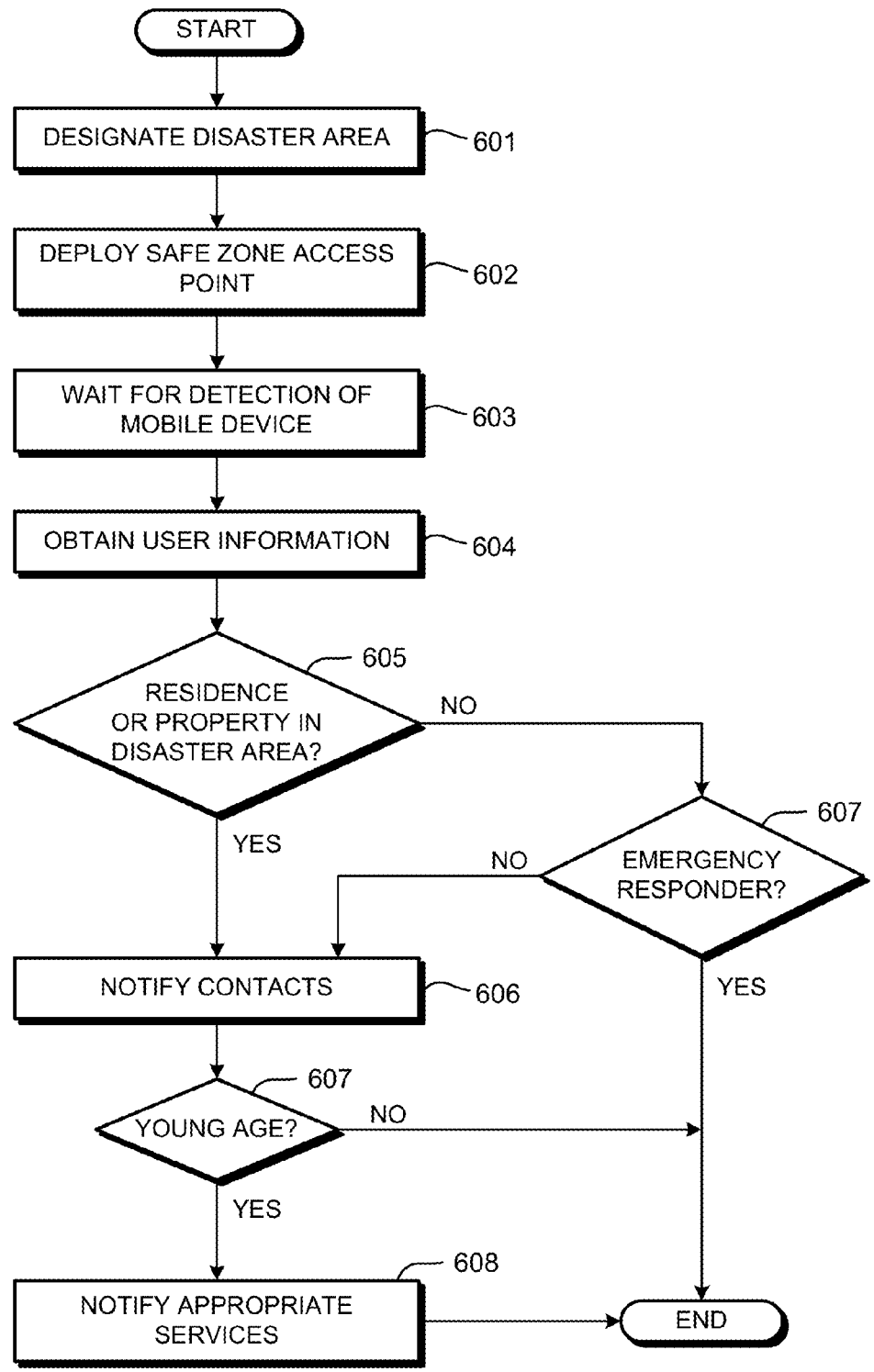
FIG. 6 shows a flow chart of an example process for responding to a disaster and providing safety notification services, in accordance with one or more aspects as described herein.

In operation, a system, such as the system of FIGS. 1-5, may operate such as will now be described in connection with FIG. 6, which is a flow chart of an example process for responding to a disaster and providing safety notification services. The various steps in this flow chart may be performed by one or more devices and/or humans, such as any of the elements of FIGS. 1-5. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 601, a disaster area may be designated by, for example, the disaster tracking system 305 and/or by another device, entity, or system. As mentioned above, in the present example, the disaster tracking system 305 may designate disaster areas by, for instance, using information provided by or otherwise derived from external sources (e.g., a government agency) and/or historical information about insurance claims. One or more disaster areas may be designated (and active) at a given time, and each may expire at some point when the disaster tracking system 305 determines that the disaster event has also expired (again, this may be derived from any information such as external information and/or insurance claim information). For instance, the disaster tracking system 305 may determine that insurance claims are less common in the disaster area (e.g., less claims per unit of time and/or per unit of geographical density), and/or that the time and/or geographical density of insurance claims drops below a predetermined threshold. In response, the disaster tracking system 305 may determine that the disaster event has expired and/or that the disaster area designation has expired.

At step 602, a safe zone 201 associated with the disaster area may be established, and one or more safe zone access points 104 may be physically deployed to the safe zone 201. Deployment may be implemented by, for example, transporting the one or more safe zone access points 104 by truck, train, aircraft, and/or boat. The safe zone access point(s) 104, once deployed, may be powered (e.g., by generators and/or the like) and activated. This may include setting up a communication link between each of the safe zone access points 104 and the safe zone notification manager 101, such as via the network 103.

At step 603, each of the safe zone access points 104, once activated, may detect the presence of one or more mobile devices 204. As discussed above, such detection may be performed wirelessly (e.g., via radio frequency, infra-red communications, etc.) and/or automatically. Other technologies for detecting the presence of a mobile device and/or the user of the mobile device may include, for example, motion detection, computer video recognition, and the like.

At step 604, during the detection interaction, the safe zone access point 104 and/or the mobile device 204 may wirelessly transmit information to each other. The information may include, for example, an identifier of the mobile device (e.g., telephone number, serial number, ESN, insurance account number, mobile device name, and/or user name). For instance, the safe zone access point 104 may intermittently transmit wireless pings (e.g., request messages). If a mobile device 204 responds to a ping, then the safe zone access point 104 may wirelessly transmit a request to the mobile device 204. In response, the mobile device 204 may wirelessly transmit, for example, the above-mentioned information.

In order for the mobile device 204 to recognize and/or respond to such pings and/or requests, the mobile device 204 may have a software application and/or driver installed thereon that is configured to recognize the pings and/or requests (and/or other messages), and to wirelessly respond with the appropriate information. Such software may be distributed by, for example, the insurance company. Upon detection of the mobile device 204, the safe zone access point 104 and/or the safe zone notification manager 101 may retrieve stored information associated with the identified mobile device 204 (step 604). The retrieved information may include, for example, information about the location(s) of residence, the location of real property or tangible property known to be owned by the user (e.g., the states in which the user's vehicles are registered, the home port of the user's boat, etc.). The retrieved information may also include information indicating whether the user is an emergency responder (e.g., a first responder such as a police officer, emergency medical technician, a fireman, and the like). The information may be stored anywhere in the system, such as at the customer relationship system 303. In this case, the safe zone access point 104 may obtain the information from the source over the network 103.

At step 605, the safe zone access point 104 and/or the safe zone notification manager 101 may determine, based on the information obtained during step 604, whether the user's residence(s) and/or property is located within the designated disaster area associated with the safe zone. If so, then the process may proceed to step 606. If not, then the process may proceed to step 607.

At step 607, the safe zone access point 104 and/or the safe zone notification manager 101 may determine, based on the information obtained during step 604, whether the user is indicated as being an emergency responder. If not, then the process may proceed to step 606. If so, then the process may end. This is because it may be assumed that a person that does not reside in or have property in the disaster area, and that is also an emergency responder, is likely not someone who the user's contacts would be concerned about with regard to the disaster area. In other words, it may be assumed that the person is in the safe zone on his or her official duties as an emergency responder. In other examples, the process may not end completely, but may proceed to one or more other steps, such as by asking the user to confirm that they do not need to be registered in the safe zone. At step 606, the safe zone access point 104 and/or the safe zone notification manager 101 may initiate a process to notify the user's predetermined contacts, a subset thereof, and/or other contacts entered by the user. In one example, the user's contacts may be automatically contacted in response to detecting the user's mobile device, without requiring any manual input by the user. In other words, the user's mere detected presence (with the user's mobile device 204) may be sufficient to initiate notifying the user's predetermined contacts. The notification may involve sending one or more messages. The one or more messages may be sent using, e.g., a communications link (e.g., satellite, microwave, etc.) provided via the safe zone access point 104, which may link to the network 103. Moreover, sometimes during a disaster, one particular telecommunications carrier (e.g., cellular phone carrier) may come back online before others of the carriers. If this occurs, the mobile devices connected to that telecommunications carrier may be utilized to potentially increase the available bandwidth for sending the messages. Some messages, in particular video messages, may benefit from such extra bandwidth. Thus, "flash network" could be essentially set up in response to detecting a carrier link being online. The detection may be performed by the safe zone access point 104 directly, and/or by one or more of the mobile device 204 detecting the new link and notifying the safe zone access point 104. In response, the safe zone access point 104 may then push the data already gathered from other customers through one or more mobile devices 204 that is/are now connected to that telecommunications carrier, thus potentially increasing message throughput.

The content of the one or more messages may be predetermined (e.g., NAME OF PERSON has been found at NAME OF SAFE ZONE). The content of the message may also depend upon input by the person, such as whether the person indicated that they are fine or of some other medical status such as by using the interactive user interface of FIG. 7. For example, if the user indicated "I'm fine," then the message may indicate to the contacts that the person is fine. Or, if the user indicated that they need medical assistance, then the message may contain some other content based on that. In further examples, there could be different messages for different contacts and/or for different types of contacts. For example, the user may want to have a more personalized message for loved ones and a more generic professional one for co-workers. In still further examples, the present system could be used as part a corporate safety procedure. For example, a call tree or other directory may be defined for a group of contacts (e.g., for a corporation or other organization). Each employee or other member of the organization may be part of the directory, which could be uploaded to be part of the predetermined contacts for each of the members of the organization. Thus, for instance, in the event of an emergency, the directory may be used so that people can call others in the tree to help figure out who is still missing. As people arrive at the safe zone, the system may automatically mark those persons as safe. Other persons in the directory may or may not also be notified. The organization may have access to the updated directory that having notations as to who is safe and who has not yet been heard from.

In another example, the user may be provided the opportunity to provide certain input to the process. To accomplish this, the safe zone access point 104 may interact with the mobile device 204 to, for example, cause the mobile device 204 to present an interactive user interface. Alternatively, the safe zone access point 104 may itself have a display (e.g., a touch-sensitive display) that presents the interactive user interface. An example of such an interactive user interface is shown in FIGS. 7-12, and is shown to be presented on the mobile device 204. However, it will be understood that the interactive user interface may alternatively be presented by a display device of the safe zone access point 104.

Figures 7, 8:
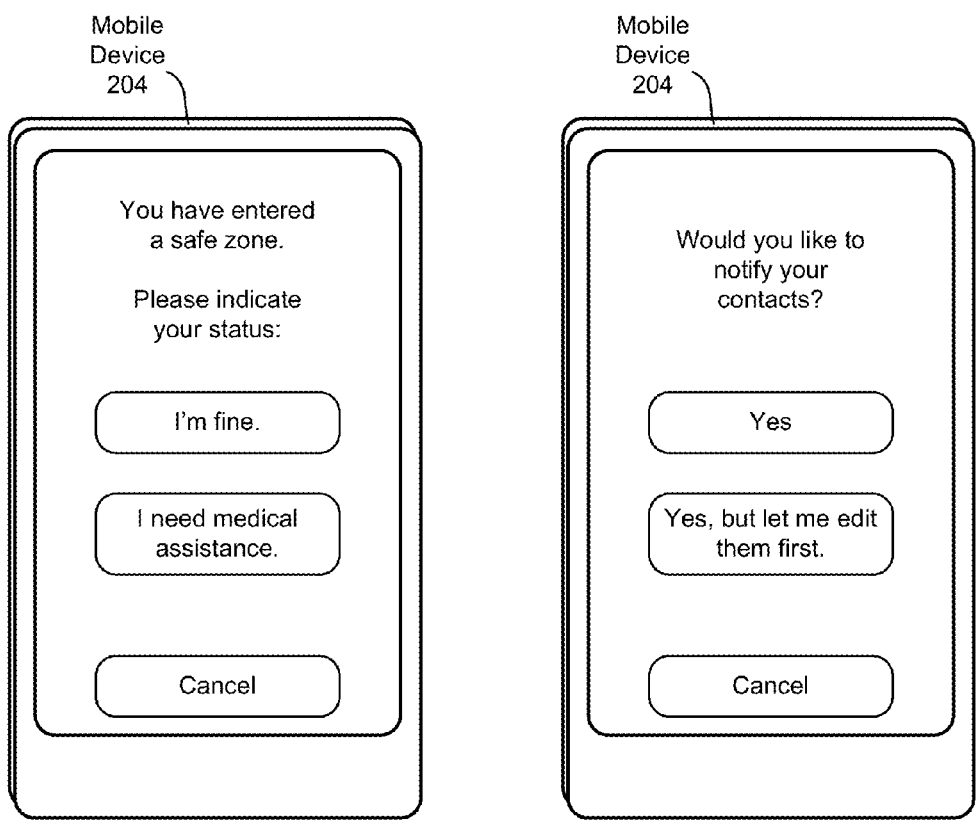
Figure 11:
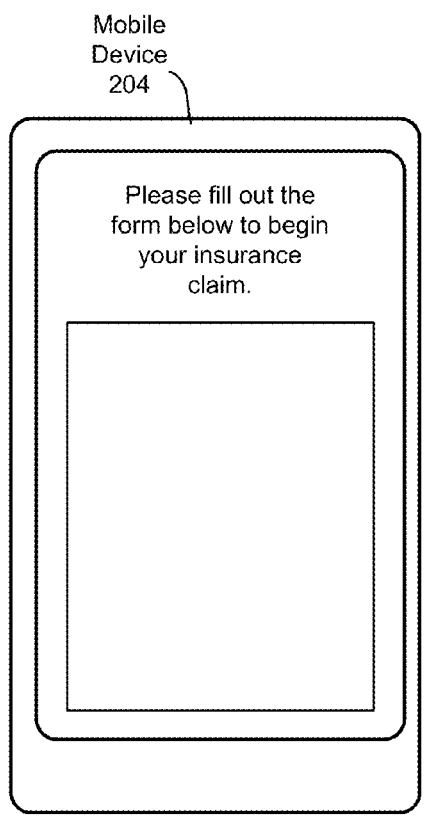
Figure 12:
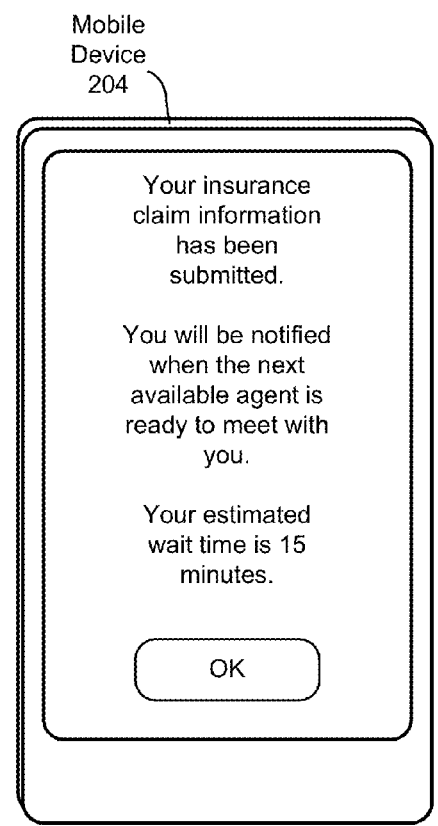

At FIG. 7, the interactive user interface may indicate (upon detection of the presence of the mobile device 204) that the user has entered a safe zone, and the interactive user interface may further request a status of the individual, such as a health status. The user may enter the appropriate status, and may then be taken to the next screen such as shown at FIG. 8. In the FIG. 8 screen, the user may be asked whether the user's contacts should be notified, and the user may respond accordingly and/or may request to edit the contacts. Alternatively, contacts may be automatically notified without user request or response. Next, as shown for example in FIG. 9, the interactive user interface may ask whether the user would like to include a video message to be provided to the contacts. If so, then the user may record a video via a camera of the mobile device 204 or via a camera of the safe zone access point 104. The video data may be stored at the safe zone access point 104 and/or sent via the network 103 to the notification system 301 for dissemination as appropriate to the external systems 306, along with any notifications, to the user's selected contacts.

After the video has been recorded (or after the video recording step has been skipped), a screen may be presented, such as shown in FIG. 10, asking whether the user is interested in initiating an insurance claim. If so, then the user may be able to enter certain information about the insurance claim directly into the interactive user interface (see, e.g., FIG. 11). At least some of the information may be pre-populated based on what the insurance company already knows about the user (such known information may be stored at, e.g., the customer relationship system 303 and/or the customer policy information system 302). The information already known and/or entered by the user via the interface may include, for example, property owned by the user, the nature of the damage to the property, the user's personal information, etc. The system may be intelligent enough to determine, by default, an expected particular real estate and/or other item of property that is to be the subject of the insurance claim. For example, the safe zone access point 104 and/or the safe zone notification manager 101 may list in the insurance claim form, by default, those items of property (including real estate) that are within the disaster area associated with the particular safe zone of the safe zone access point 104. Other default information may include, for instance, an indication of the type of damage that likely occurred to the property. This may be a guess that is made by the system based on the type of disaster, the location of the property, and/or the type of property. For example, if a user's immediate neighbor already submitted an insurance claim for this disaster, indicating that a wildfire burned his or her house down, then the system may make the default assumption that the user's house (next door) was also damaged by the wildfire. The user may edit any of the default information or accept the default information.

Once the information has been entered and accepted by the user, the user may be placed in an electronic queue to be seen by a human insurance company employee or other agent (e.g., an insurance adjuster) in furtherance of the insurance claim. The human employee or other agent may be physically located in the safe zone (such as in a temporary building or tent) and/or may be reachable remotely via electronic communication means. The user may be informed by the interactive user interface (see, e.g., FIG. 12) that the user is now in the queue, and may also indicate an estimated wait time to discuss the insurance claim with the agent. In some cases, the insurance claim may be resolved on the spot (with or without discussing with the agent), such as by providing payment to the user and/or the arranging of certain inspections and/or repairs. While certain screens are shown in a certain order in FIGS. 7-12, these are intended to be only examples. Moreover, the screens and/or steps described with reference to the interactive user interface may include different information, be presented in a different manner, and/or be presented in a different order than shown in FIGS. 7-12.

Before, during, and/or after the user is interacting with the interactive user interface, at step 606, the system may notify the user's contacts with a message that may include, for example, any video message recorded by the user as discussed previously. To notify the contacts, the safe zone access system 104, for example, may communicate with the notification system 301 (e.g., via the network 103) to cause the notification system 301 to disseminate the notification message to the contacts in the manner specified by the user during the interactive interface and/or as specified in accordance with the user's predetermined user profile (e.g., contacts that the user had pre-selected prior to the disaster).

At step 607, the system (e.g., the safe zone access point 104 and/or the safe zone notification manager 101) may use the user's profile information and/or information provided through the interactive user interface to determine whether the user is of a young age. For example, it may be determined whether the user's known age is below a predetermined threshold age, or whether the user's known age is equal to or below the predetermined threshold age. The predetermined threshold age may be any age, such as but not limited to, age 18, age 21, age 16, age 12, etc. In further examples, there may be more than one predetermined threshold age. For instance, there may be a first predetermined threshold age and a different second predetermined threshold age, where it is determined whether the user's known age is in the three age ranges that are divided by the first and second predetermined threshold ages.

Depending upon the age and/or the age range of the user as compared with the one or more predetermined threshold ages, then at step 608, a notification may also be sent to one or more other contacts that were not specified by the user. For example, if the user is determined to be sufficiently young, then a child services agency may be notified that the user is within the safe zone. In other examples, different subsets of the predetermined user contacts may be notified depending upon the user's age. In still further examples, where a relationship is known between the user and another individual that is also a customer of the insurance company (e.g., the user and the user's father, mother, grandparents, etc.), then one or more of such related individuals may also be contacted. The relationship may be determined, e.g., via the user's (or the other individual's) customer profile. In some cases, the user may or may not be a direct customer of the insurance company, but rather may be related (e.g., familial relationship) with the other individual who is directly a customer of the insurance company. For example, if the parents of the user are customers but the user himself/herself is not, and if the parents' customer profile indicates that the user is the son or daughter of the customer parents, then the parents may be automatically notified of the user's presence in the safe zone, regardless of whether the user has ever even selected a contact.

The term, customer, as used herein, is intended to broadly include not only persons who pay for insurance coverage, but also any person who uses the services of a service provider such as the insurance company, regardless of whether a fee is charged for those services. Thus, a customer may also include a person who uses the safe zone notification features described herein, such as by pre-selecting contacts and/or establishing a customer profile, regardless of whether such services are provided at a cost or for free.

The various features described above are merely non-limiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method, comprising:
    determining, by a system comprising at least one computing device, a disaster area;
    determining, via a wireless sensor, that a mobile device in a safe zone is associated with a person who resides in the disaster area or who has property in the disaster area; and
    responsive to determining that the mobile device is registered to the person who resides in the disaster area or who has property in the disaster area, sending, by the system, a message to a plurality of contacts.

2. The method of claim 1, further comprising selecting the plurality of contacts based on an identity of the mobile device.

3. The method of claim 1, further comprising determining whether the person is an emergency responder, wherein the sending the message to the plurality of contacts is performed also responsive to determining that the person is not an emergency responder.

4. The method of claim 1, wherein the determining the disaster area comprises—determining the disaster area based on a plurality of insurance claims.

5. The method of claim 1, further comprising using the mobile device and at least one computing device to initiate an insurance claim.

6. The method of claim 1, wherein the determining whether the mobile device in the safe zone is associated with a person who resides in the disaster area or who has property in the disaster area is performed based on predetermined profile data associated with the person.

7. The method of claim 1, further comprising:
    determining an age of the person; and
    selecting the plurality of contacts based on the age of the person.

8. The method of claim 1, further comprising:
    determining the safe zone based on the disaster area; and
    deploying the wireless sensor to wirelessly monitor the safe zone.

9. A system, comprising:
    a disaster tracking system configured to determine a disaster area;
    an access point comprising at least one computing device and at least one wireless sensor, the access point being configured to wirelessly detect the presence of a mobile device in a safe zone, and to send a message over a network indicating the detected presence; and
    a notification manager communicatively coupled to the access point via the network and comprising at least one computing device, the notification manager being configured to receive the message, determine whether the mobile device is associated with a person who resides in the disaster area or who has property in the disaster area, and, if so, send a message to a plurality of contacts.

10. The system of claim 9, wherein the access point is configured to wirelessly communicate with the mobile device to initiate an insurance claim.

11. The system of claim 9, wherein the notification manager is configured to select the plurality of contacts based on an identity of the mobile device.

12. The system of claim 9, wherein the notification manager is configured to receive data identifying the plurality of contacts, associate the data with the mobile device, and after the receiving, notify the disaster tracking system.

13. The system of claim 9, wherein the notification manager is configured to determine whether the person is an emergency responder, and to send the message to the plurality of contacts also if it is determined that the person is not an emergency responder.

14. The system of claim 9, wherein the disaster tracking system is configured to determine the disaster area based on a plurality of insurance claims.

15. The system of claim 9, wherein the wireless sensor comprises a near-field communication (NFC) circuit configured to wirelessly detect the presence of the mobile device.

16. A method, comprising:
    determining, by a system comprising at least one computing device, a disaster area;
    determining, via a wireless sensor, that a mobile device in a safe zone is associated with a person who is not an emergency responder, who does not reside in the disaster area, and who does not have property in the disaster area; and
    responsive to determining that the person is not an emergency responder, does not reside in a disaster area, and does not have property in the disaster area, sending, by the system, a message to a plurality of contacts.

17. The method of claim 16, further comprising determining the plurality of contacts based on an identity of the mobile device.

18. The method of claim 17, further comprising determining an age of the person, wherein the determining the plurality of contacts comprises determining the plurality of contacts based on the age of the person and the identity of the mobile device.

19. The method of claim 16, further comprising recording a video message of the person, wherein the sending the message comprises sending the video message.

20. The method of claim 16, further comprising:
    determining the safe zone based on the disaster area; and
    deploying the wireless sensor to wirelessly monitor the safe zone.

* * * * *